United States Patent
Segev et al.

(10) Patent No.: US 9,525,508 B2
(45) Date of Patent: Dec. 20, 2016

(54) MODE DIVISION MULTIPLEXING OPTICAL LINK

(71) Applicant: Rafael Advanced Defense Systems Ltd., Haifa (IL)

(72) Inventors: Yehonatan Segev, Haifa (IL); Dan Vadim Regelman, Kiryat Bialik (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 0 days.

(21) Appl. No.: 14/761,458

(22) PCT Filed: Nov. 28, 2013

(86) PCT No.: PCT/IL2013/050984
§ 371 (c)(1),
(2) Date: Jul. 16, 2015

(87) PCT Pub. No.: WO2014/111912
PCT Pub. Date: Jul. 24, 2014

(65) Prior Publication Data
US 2015/0372782 A1 Dec. 24, 2015

(30) Foreign Application Priority Data

Jan. 17, 2013 (IL) .......................................... 224301

(51) Int. Cl.
*H04J 14/00* (2006.01)
*H04B 10/00* (2013.01)
(Continued)

(52) U.S. Cl.
CPC ........... *H04J 14/04* (2013.01); *H04B 10/2581* (2013.01)

(58) Field of Classification Search
CPC ... G02B 6/14; G02B 6/02047; G02B 6/02061; G02B 6/02071; G02B 6/26; G02B 6/3504; G02B 6/3578; H04J 14/04; H04B 10/2581
(Continued)

(56) References Cited

U.S. PATENT DOCUMENTS 5,473,457 A * 12/1995 Ono .................... H04B 10/2572
385/11
5,903,684 A * 5/1999 Payton .................. G02F 1/0136
385/1
(Continued)

FOREIGN PATENT DOCUMENTS

| EP | 1 510 848 A1 | 3/2005 |
| IL | 220027 | 6/2013 |
| WO | WO 2013/179281 A1 | 12/2013 |

OTHER PUBLICATIONS

Patent Cooperation Treaty, International Search Report, International Patent Application No. PCT/IL2013/050984, Apr. 6, 2014, 4 Pages.
(Continued)

*Primary Examiner* — David Payne
*Assistant Examiner* — Tanya Motsinger
(74) *Attorney, Agent, or Firm* — Fenwick & West LLP (57) ABSTRACT

The invention is a method and apparatus for creating mode division multiplexed channels capable of integration into photonic integrated circuits with direct spatial separation at the receiver end, thus removing the need for a DMUX module or at least significantly simplifying it. This is achieved by using a set of actuators that induce controllable mode mixing in a multi-mode fiber (MMF) at the transmitter in such a way that spatially separated channels are achieved at the receiver. As a result, no DMUX is required and failure
(Continued)

of a single channel does not cause total communication link failure as occurs in links implemented with MUX/DMUX.

8 Claims, 11 Drawing Sheets

(51) Int. Cl.
    *H04J 14/04* (2006.01)
    *H04B 10/2581* (2013.01)

(58) Field of Classification Search
    USPC .......................................... 398/43, 44; 385/1
    See application file for complete search history.

(56) References Cited

U.S. PATENT DOCUMENTS

| | | | |
|---|---|---|---|
| 6,493,474 B1* | 12/2002 | Yao | G02B 6/105 359/489.06 |
| 6,594,408 B1* | 7/2003 | Noe | H04B 10/2569 385/11 |
| 6,628,861 B1* | 9/2003 | Yao | G02B 6/02071 385/24 |
| 6,694,284 B1* | 2/2004 | Nikoonahad | G01N 21/211 702/155 |
| 6,754,404 B2* | 6/2004 | Yao | G02F 1/0136 359/489.06 |
| 7,218,814 B2* | 5/2007 | Vorobeichik | G02B 6/14 385/15 |
| 7,844,144 B2 | 11/2010 | Kahn et al. | |
| 7,945,130 B2 | 5/2011 | Yan et al. | |
| 9,329,416 B2* | 5/2016 | Regelman | G02F 1/035 |
| 2003/0021512 A1* | 1/2003 | Guerin | G02B 6/022 385/10 |
| 2003/0128723 A1* | 7/2003 | Bayart | G02B 6/2856 372/6 |
| 2003/0175001 A1* | 9/2003 | Lawrence | G02B 6/266 385/140 |
| 2004/0036005 A1* | 2/2004 | Lim | F15B 13/0438 250/205 |
| 2008/0267560 A1* | 10/2008 | DiGiovanni | G02B 6/14 385/28 |
| 2009/0169220 A1* | 7/2009 | Kahn | G02B 6/4206 398/200 |
| 2010/0290738 A1* | 11/2010 | Yan | G02B 6/14 385/28 |
| 2010/0296765 A1* | 11/2010 | Yagodkin | G02B 6/14 385/1 |
| 2012/0302862 A1* | 11/2012 | Yun | A61B 5/0075 600/398 |
| 2013/0003343 A1* | 1/2013 | Sudarshanam | G02B 27/48 362/19 |
| 2013/0126713 A1* | 5/2013 | Haas | H04B 10/116 250/208.2 |
| 2014/0029941 A1* | 1/2014 | Bratkovski | H04J 14/04 398/43 |
| 2014/0126915 A1* | 5/2014 | Gruner-Nielsen | H04J 14/04 398/143 |
| 2014/0199065 A1* | 7/2014 | Bratkovski | H04B 10/2581 398/44 |
| 2014/0212089 A1* | 7/2014 | Dimmick | G02B 6/24 385/27 |
| 2014/0301707 A1* | 10/2014 | Sisto | G02B 6/14 385/124 |
| 2015/0015879 A1* | 1/2015 | Papadopoulos | G02B 23/26 356/301 |
| 2015/0131936 A1* | 5/2015 | Regelman | G02B 6/14 385/3 |
| 2015/0372782 A1* | 12/2015 | Segev | H04J 14/04 398/44 |

OTHER PUBLICATIONS

Patent Cooperation Treaty, Written Opinion of the International Searching Authority, International Patent Application No. PCT/IL2013/050984, Apr. 6, 2014, 8 Pages.

* cited by examiner

MODE DIVISION MULTIPLEXING OPTICAL LINK

FIELD OF THE INVENTION

The invention is from the field of communication systems. Specifically the invention is from the field of increasing the bandwidth of optical communication systems.

BACKGROUND OF THE INVENTION

In order to attempt to meet a growing need of optical communication bandwidth, several methods for increasing the bandwidth of optical fibers have been implemented. Amongst these methods are: increasing the direct signal modulation speed, wavelength division multiplexing, coherent detection, polarization division multiplexing, and quadrature amplitude modulation. Further increase in the communication bandwidth is possible by utilization of a spatial degree of freedom, wherein different channels are differentiated spatially from each other. This method is known as mode division multiplexing (MDM).

The main advantage of MDM is its ability to incorporate all prior technologies, thus multiplying the total bandwidth by the number of available spatial channels. One of possible implementations of MDM is a multi-core fiber, in which several cores are present within a common cladding in a single fiber. Each core is used as a separate communication channel.

Figure 1A:
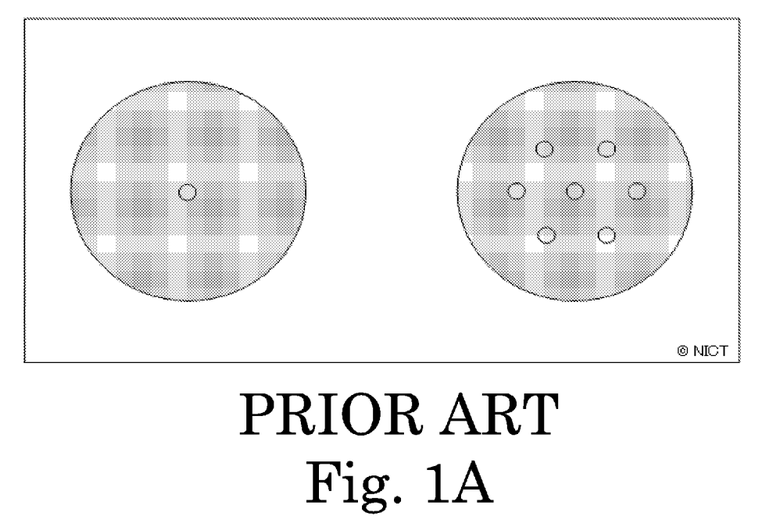
FIG. 1A and FIG. 1B schematically illustrate a prior art multicore fiber system.
Figure 1B:
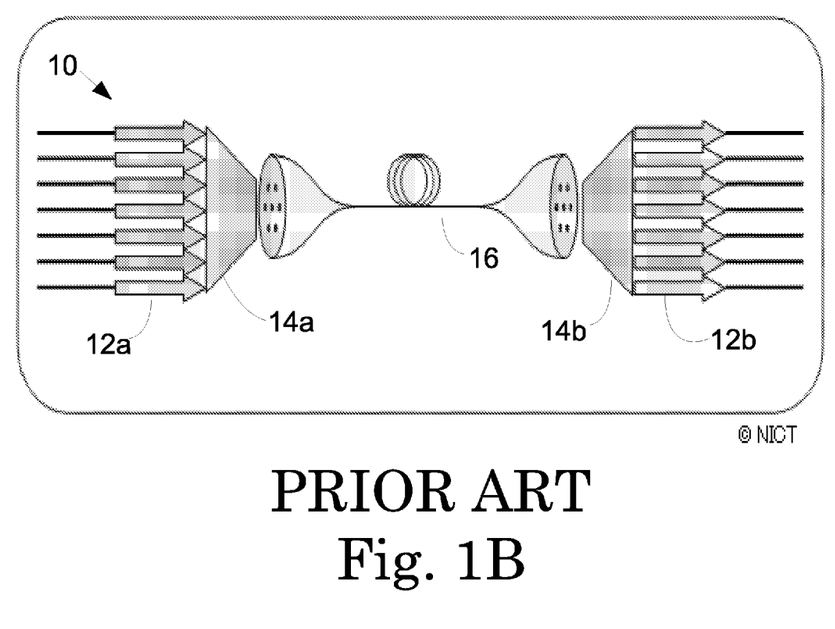

FIG. 1A and FIG. 1B schematically illustrate a prior art multicore fiber system. FIG. 1A shows the cross-sections of a single core fiber on the left and a seven core fiber on the right.

FIG. 1B shows a typical layout for a 109 Tbit transmission communication system 10 that is based on the use of a multi-core fiber. The input to the system is via seven individual single core fibers 12a, each of which is capable of transmitting 15.58 Tbits. The input fibers are connected by coupling device 14a to one end of a 16.8 km long seven core fiber 16. At the other end of the multi-core fiber a connector 14b connects each of the seven cores to an individual single core output fiber 12b. A drawback of this method is that it requires dedicated, complex, passive and active components such as filters, add drop components, amplifiers, switches, splitters, etc.

In order to reduce the complexity and cost it would be highly advantageous to utilize a single multimode fiber (MMF) core for transmitting various spatially separated communication channels. Amongst the names given to this method is mode division multiplexing (MDM). For example, one of the simplest, but not practical, ways to implement MDM is to use each mode as a separate channel.

Several implementation methods had been proposed and demonstrated for MDM. One of the methods utilizes a spatial light (phase) modulator (SLM). The laser light phase is intentionally altered in such a way, that it complies with particular selected mode launch conditions. In this way a spatially distinguishable communication channel is established. Several of these channels can be combined into a single fiber by a beam splitter element.

Figure 2:
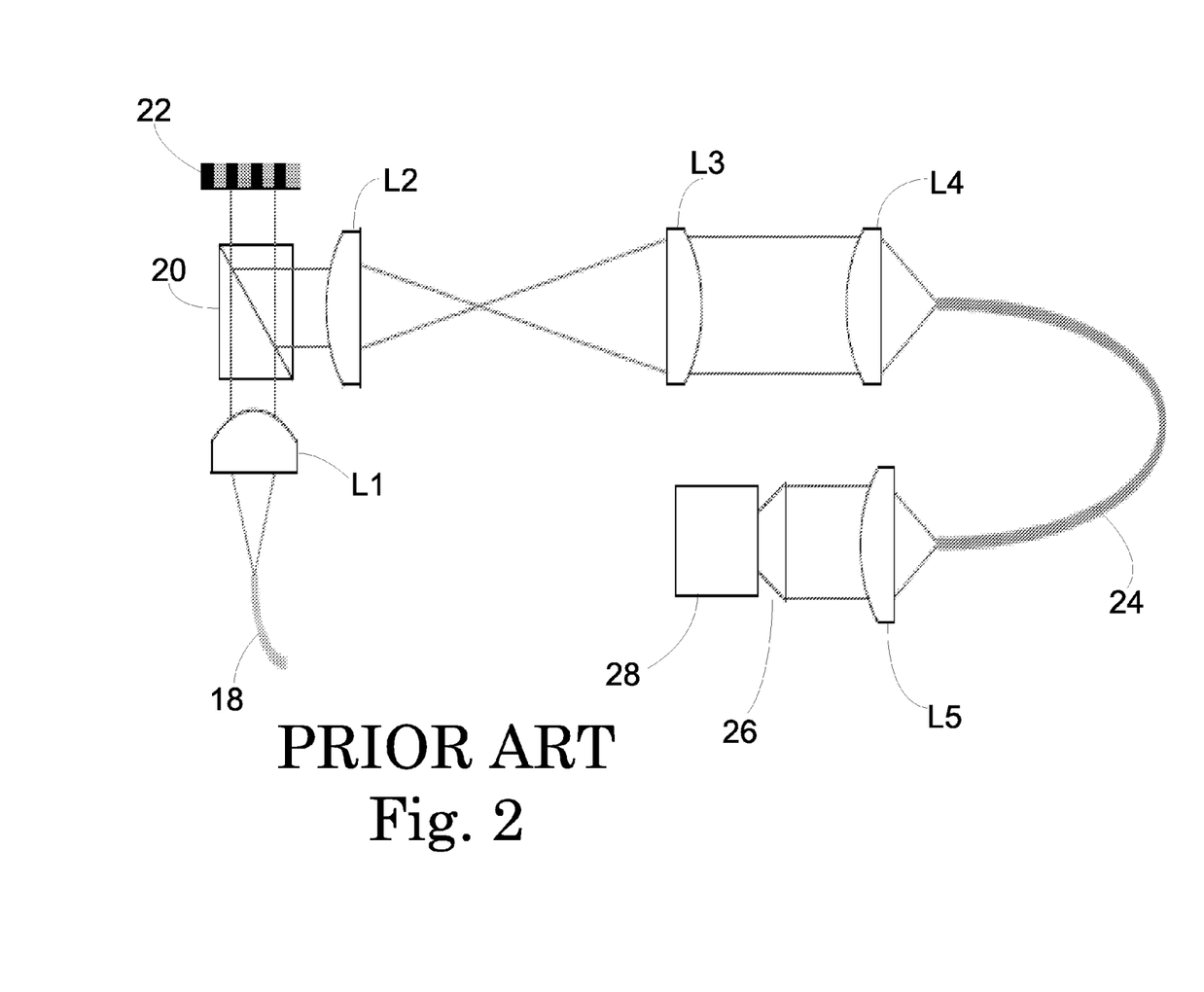
FIG. 2 schematically illustrates a prior art fiber mode launch/detection system comprising a spatial light modulator.

FIG. 2 schematically illustrates an example of a prior art fiber mode launch/detection system comprising a SLM. Light from a fiber source 18 is collimated by lens L1. The collimated light passes through a polarizing beam splitter (PBS) 20 and to a binary SLM 22. Light reflected from the SLM 22 is directed by the PBS 20 through lenses L2, L3, and L4 that focus it into the core at one end of MMF 24. The light exits at the other end of MMF 24 and passes through lens L5 and optical elements 26 that focus it on the focal plane of CCD 28.

An apparatus and method for increasing the communication bandwidth by reducing the modal dispersion in MMF using a SLM is taught by Kahn et al. in U.S. Pat. No. 7,844,144.

Figure 3:
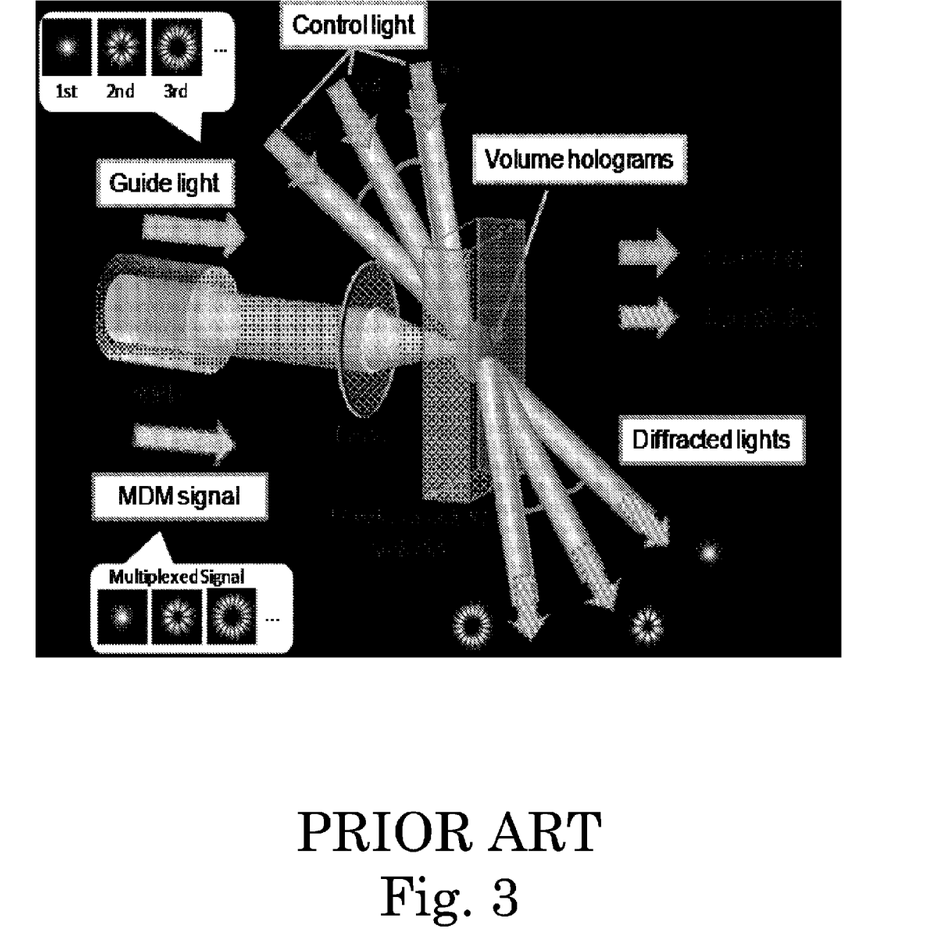
FIG. 3 schematically shows a prior art volume hologram based method for separating the modes exiting a MMF at the optical receiver.

At the receiver end of the communication system, there is a need to spatially separate different modes from each other. In the optimal arrangement the modes would be focused on separate photodetectors; however, in most prior art schemes, a combination of spatial modes are detected by each photodetector and demultiplexing is applied to separate the modes using digital computations One of the proposed methods to accomplish the mode separation is utilization of a volume hologram, which is especially designed to separate the desired modes from each other by using control light. FIG. 3 schematically shows a prior art volume hologram based method for separating the modes exiting a MMF at the optical receiver.

Both spatial light modulators and volume holograms are complicated free space optical devices. Therefore the possibilities of integrating them into photonic integrated circuits are very limited.

Since spatial mode separation at the receiver is complicated, digital multiplexing (MUX) and demultiplexing (DMUX) of the channels is used. This requires a-priori knowledge of the spatial mixing of channels and/or a dedicated feedback channel for enabling MUX and DMUX modules. Those modules are one of the main complexities of MDM.

Figure 4:
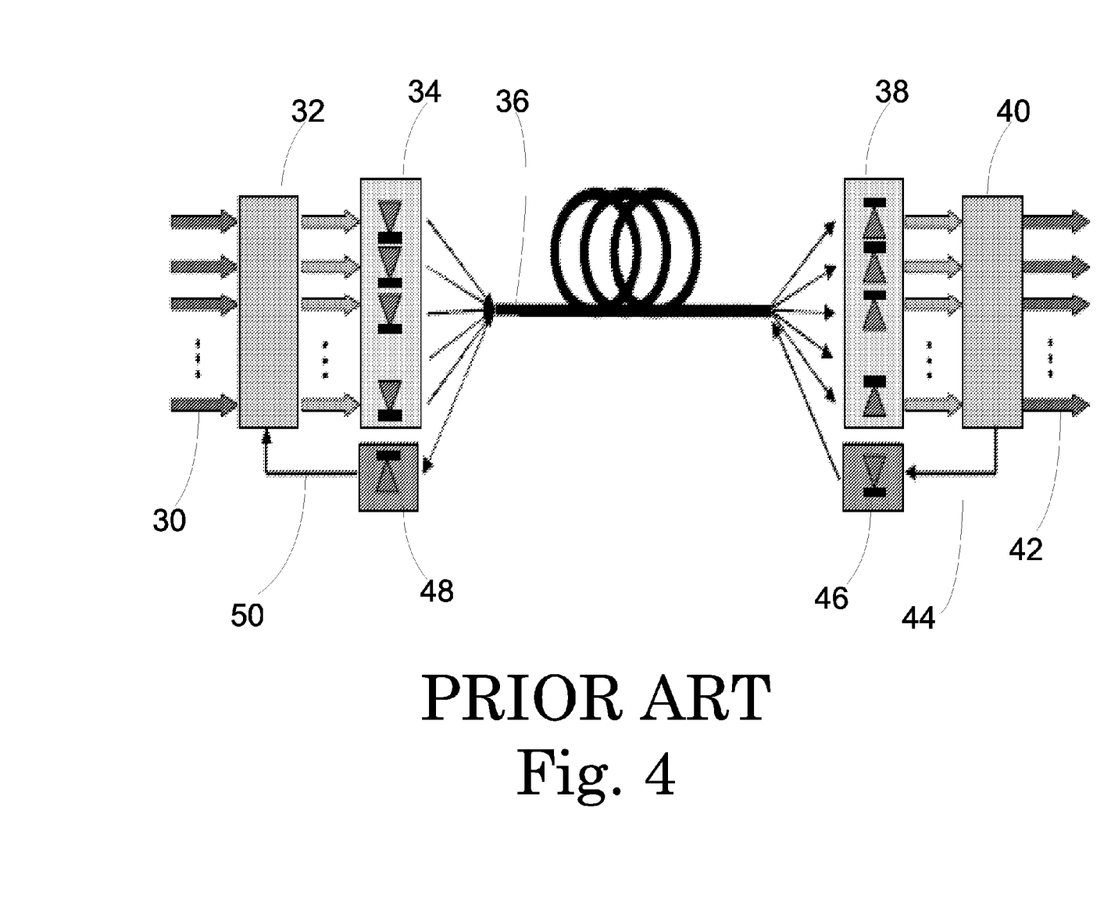
FIG. 4 schematically shows a prior art layout of a mode division multiplexing based optical communication link.

FIG. 4 schematically shows a prior art layout of a mode division multiplexing based optical communication link. In this method N input signals 30 are processed by signal processing unit 32, which outputs N sources 34. The light from sources 34 enters one end of multimode fiber 36 and exits at the other end where it is detected by N detectors 38. The detected signals are sent from detectors 38 to signal processing unit 40, which outputs N recovered signals 42. To accomplish mode separation at the receiver end a feedback signal 44 is created by signal processing unit 40. Feedback signal 44 activates laser 46, whose output travels through MMF 36 and is detected by detector 48. The output signal 50 from detector 48 is feed into signal processing unit 32 and utilized in generating sources 34.

Another method for launching spatially distinguishable modes into a gradient index multimode fiber (GI-MMF) is focusing of a single mode beam onto a GI-MMF core with spatial offset from center. In this way spatially distinguishable modes are obtained and a known DMUX matrix can be used to distill the data from each channel. One of the main advantages of GI-MMF is its reduced mode mixing properties, while it maintains its modal structure for 1-2 km. This is important since, on the one hand, mode division multiplexing requires maximum separation between the modes or group of modes and, on the other hand, multi-mode fibers exhibit mode mixing when the fiber bends and stress and imperfections cause different modes to exchange power between them.

Another demonstration of MDM was done by a selective launch of few first modes into a few mode fiber (FMF) and subsequent use of phase plates and beam splitters for modes separation at the receiver end.

Each of the methods described above has its drawbacks that have prevented it from being universally accepted and used in practical optical communication systems.

It is therefore a purpose of the present invention to provide a method for mode division multiplexing in an optical fiber communication system that is relatively simple and economical to carry out.

Further purposes and advantages of this invention will appear as the description proceeds.

SUMMARY OF THE INVENTION

In a first aspect the invention is a method for creating mode division multiplexed channels in a multimode optical fiber (MMF). The channels are capable of integration into photonic integrated circuits and possess direct spatial separation at the receiver end of the circuit. The method comprises:

A. at least two channels are created, wherein for each of the channels:
  a) light from a modulated light source is transmitted through an input end of a MMF that passes through a set of actuators;
  b) the set of actuators is activated to induce controllable mode mixing in the waveguide;
  c) light that exits the waveguide is detected with a feedback photodiode array;
  d) output of the feedback photodiode array is fed to a signal processor unit;
  e) signals processed by the signal processor unit are fed to an actuator controller; and
  f) output signals from the actuator controller are used as feedback to control the actuators;

B. light at an output end of the MMF in each of the at least two channels is coupled into a single long length MMF; and C. the light from an output end of the single long length MMF is detected with a receiver array of photodiodes.

In embodiments of the method of the invention each of the at least two channels additionally comprises a waveguide.

In embodiments of the method of the invention, each channel comprises a waveguide, a set of actuator control (AC) components and a set of feedback signal processing (FSP) components, the long length MMF is a Gradient Index MMW (GI-MMF), and, for each channel in step (c), the feedback photodiode array detects light from a location between the AC components and a beam connector that couples the channel to the GI-MMF.

In embodiments of the method of the invention, each channel comprises a waveguide and its own set of AC components, and feedback to the actuators is provided by means of a single set of FSP components by sequentially connecting each of the channels to the set of FSP components while all other channels are switched off. In these embodiments, if the long length MMF is a GI-MMF then, in step (c), for each channel, the feedback photodiode array can detect light from a location on the GI-MMF after all beam connectors that couple the channels to the GI-MMF. If the long length MMF is comprised of a GI-MMF, a non-mode preserving MMF, or lengths of GI-MMF and non-mode preserving MMF optically coupled together; then, for each channel in step (c), the feedback photodiode array can detect feedback signals created by an output signal processor from output from the receiver photodiodes and transmitted from the output side to the input side of the long length MMF by a backward optical channel via the long length MMF.

In a second aspect the invention is an optical communication system comprising mode division multiplexed channels in a long length multimode optical fiber (MMF). The system comprises:

A. on the input side:
  a) at least two input channels comprised of a modulated light source and a length of MMF that passes through a set of actuators;
  b) at least one set of feedback signal processing (FSP) components (wherein each set of FSP components is comprised of a photodiode array, a processor unit, and an actuators controller);

B. a single long length of MMF;

C. at least two beam connectors, one for each of the channels adapted to optically couple the input channels to the single long length of MMF; and D. a detector array of photodiodes on the output side of the single long length of MMF.

In embodiments of the system of the invention, each of the at least two input channels additionally comprises a waveguide.

In embodiments of the system of the invention, the long length MMF can be comprised of a Gradient Index MMW (GI-MMF), a non-mode preserving MMF, or lengths of GI-MMF and non-mode preserving MMF optically coupled together.

In embodiments of the system of the invention, each channel comprises a waveguide, the long length MMF can be comprised of a Gradient Index MMW (GI-MMF), a non-mode preserving MMF, or lengths of GI-MMF and non-mode preserving MMF optically coupled together.

In embodiments of the system of the invention, each input channel comprises a set of FSP components; a set of actuator control (AC) components (wherein each set of AC components is comprised of a waveguide and a set of actuators), and the long length MMF is a GI-MMF; for each channel, the set of FSP components is coupled to the system such that the feedback photodiode array detects light from a location between the AC components and the beam connector that couples the channel to the GI-MMF.

In embodiments of the system of the invention, each input channel comprises its own set of AC components and a single set of FSP component is adapted to provide feedback to the actuators in each channel sequentially by connecting the channel to the set of FSP components while all other channels are switched off. In these embodiments, if the long length MMF is a GI-MMF, then the set of FSP components can be coupled to the system such that, for each channel, the feedback photodiode array detects light from a location on the GI-MMF after all of the beam connectors that couple the input channels to the GI-MMF.

Embodiments of the system of the invention comprise an output signal processor adapted to receive and create output feedback signals from the detector array of photodiodes on the output side of the single long length of MMF. In these embodiments each input channel comprises its own set of AC components and a single set of FSP component is adapted to provide feedback to the actuators in each channel sequentially by connecting the channel to the set of FSP components while all other channels are switched off. The set of FSP components can be coupled to the system such that, for each channel, the feedback photodiode array detects the output feedback signals created by the output signal processor; and the long length MMF comprises a backward optical channel via which the output feedback signals are transmitted from the output side of the long length MMF to the input side of the long length MMF.

All the above and other characteristics and advantages of the invention will be further understood through the following illustrative and non-limitative description of embodiments thereof, with reference to the appended drawings.

DETAILED DESCRIPTION OF EMBODIMENTS OF THE INVENTION

The present invention is a method and apparatus for creating mode division multiplexed channels capable of integration into photonic integrated circuits with direct spatial separation at the receiver end, thus removing the need for a DMUX module or at least significantly simplifying it. This is achieved by using a set of actuators that induce controllable mode mixing in a multi-mode fiber (MMF) at the transmitter in such a way that spatially separated channels are achieved at the receiver. As a result, no DMUX is required and failure of a single channel does not cause total communication link failure as occurs in links implemented with MUX/DMUX.

Figure 5:
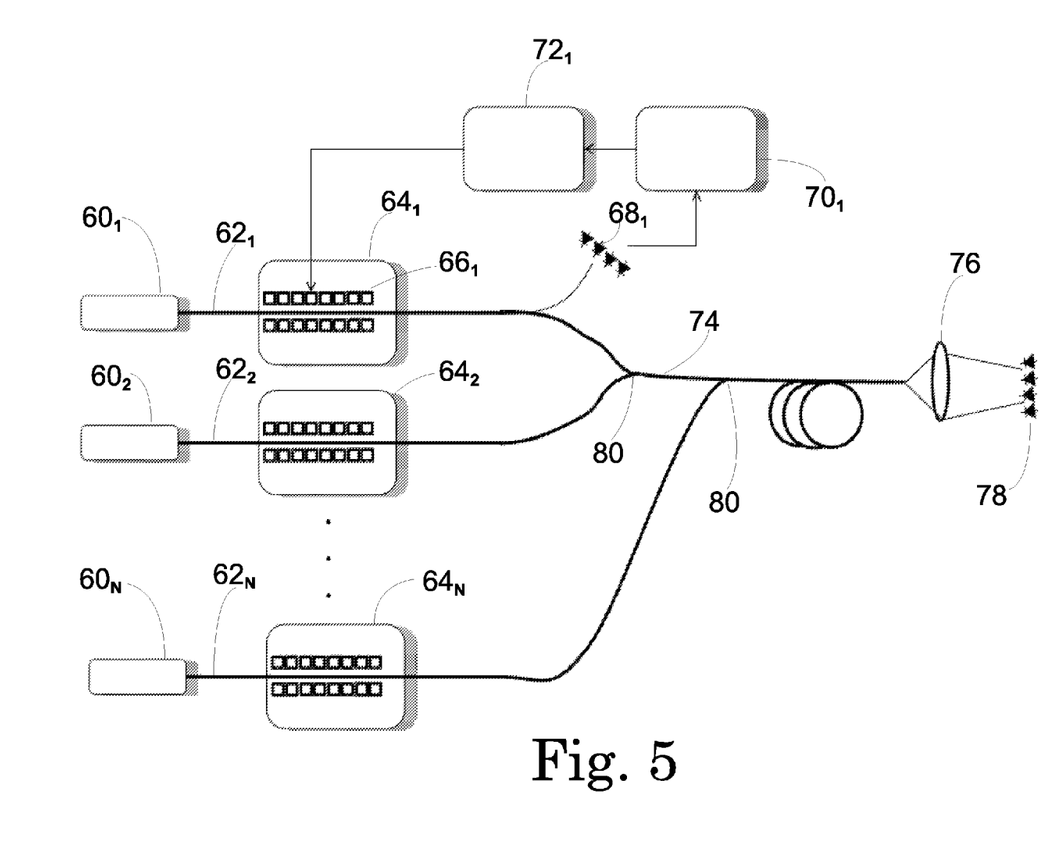
FIG. 5 schematically shows the layout of an embodiment of the invention.

FIG. 5 schematically shows the layout of the invention. Referring to a first channel—a modulated light source $60_1$ is transmitted through multi-mode fiber (MMF) $62_1$, which is coupled to a waveguide $64_1$, and through actuators $66_1$ that are capable of inducing controllable mode mixing in the waveguide $64_1$. At the transmitter part, after passing through waveguide $64_1$, the light is detected by feedback photodiode array $68_1$. The output from feedback photodiode array $68_1$ is processed by signal processor unit $70_1$ and used as feedback for actuators controller $72_1$, which controls actuators $66_1$. The light travelling through MMF $62_1$ is coupled into a long length of gradient index multimode fiber (GI-MMF) 74. In this embodiment the feedback photodiodes for creating the desired spatial modes can be placed before the long length of fiber, because in GI-MMF fibers the modes composition is maintained resulting in minimal mode mixing. At the receiver end, an optical arrangement represented by lens 76 focuses the light on a photodiode detector array 78. As shown in FIG. 5, several channels can be combined and inputted into a single GI-MMF fiber by beam combiners 80. Each of the channels comprises a waveguide $64_1$, and actuators $66_1$ (collectively called herein actuator control (AC) components) and photodiode array $68_i$, processor unit $70_i$, and actuators controller $72_i$ (collectively called herein feedback signal processing (FSP) components). In FIG. 5, only the AC is shown for channels 2-N in order to simplify the figure.

Figure 11:
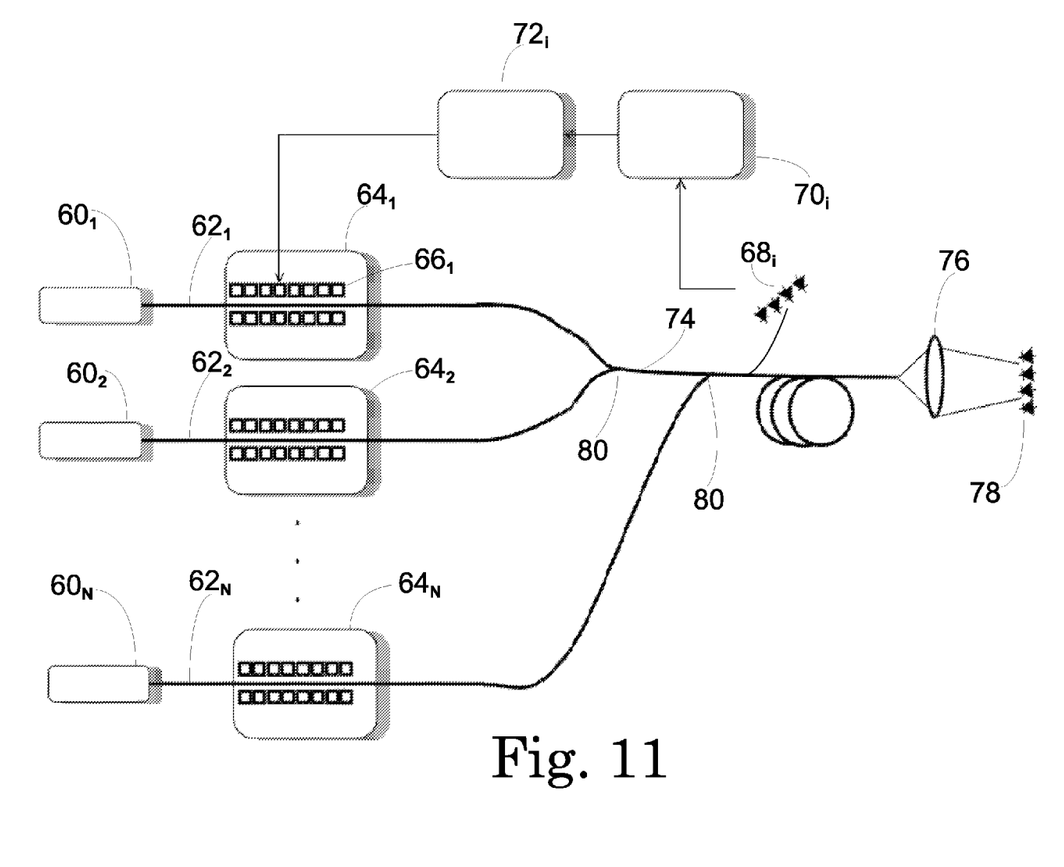
FIG. 11 schematically shows the layout of another embodiment of the invention.

In an alternative embodiment schematically shown in FIG. 11, all FSP components are combined into a single set and the feedback photodiode array 68 is coupled to the GI-MMF fiber 74 after all channels have been combined. In this embodiment the feedback is accomplished by time multiplexing for each channel. The single photodiode array, which is capable of detecting light from all of the channels, detects each channel separately (channel 1 is shown being detected in the figure) by periodically switching off all channels except the one to be "tuned". Then the other channels are "tuned" sequentially. This process takes a short enough time (<100 ms) and is performed with low enough frequency (<<1 Hz), so that the "maintenance breaks" do not significantly affect the total data transmission bandwidth.

Figure 6:
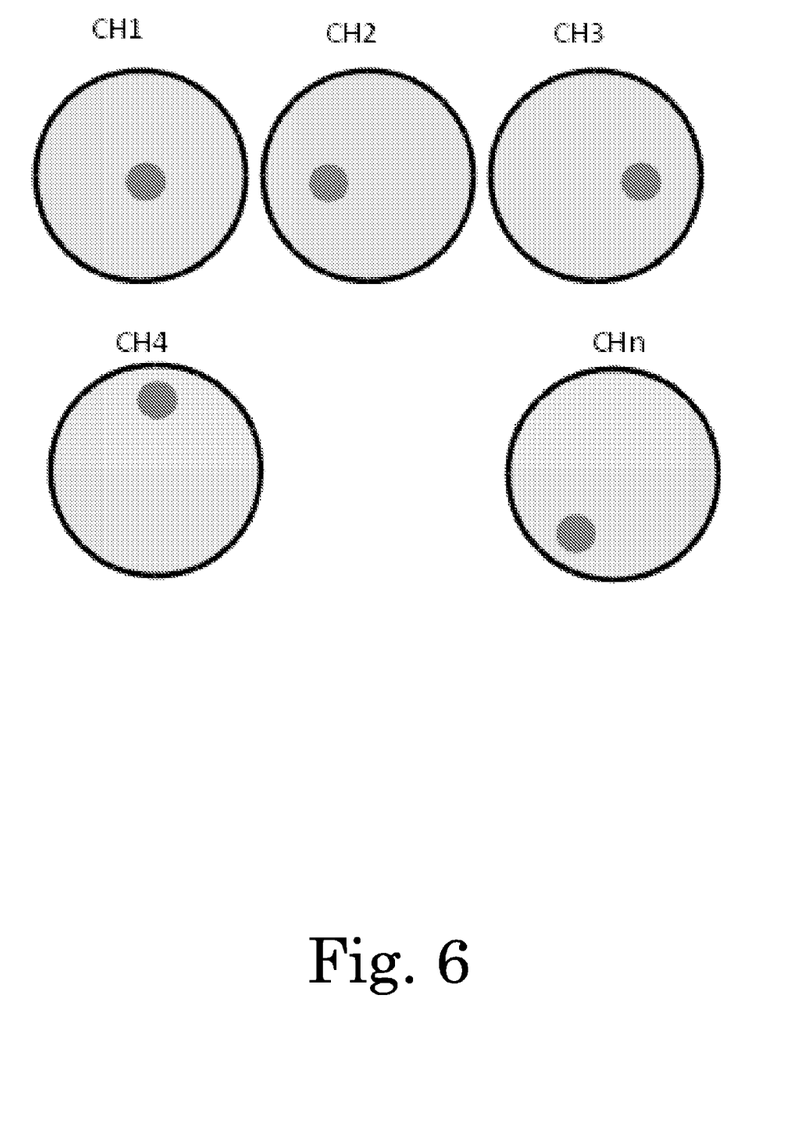
FIG. 6 is a series of cross-sectional views symbolically showing how the actuator controllers create spatially separated modes for each channel and minimize the spatial overlap between distinct modes.

FIG. 6 is a series of cross-sectional views of MMF 74 symbolically showing how the actuator controllers $72_i$, using the feedback from photodiode arrays $68_i$, adjusts the actuators $66i$ to create spatially separated modes for each channel. The optimization process minimizes the spatial overlap between distinct modes.

Figure 7:
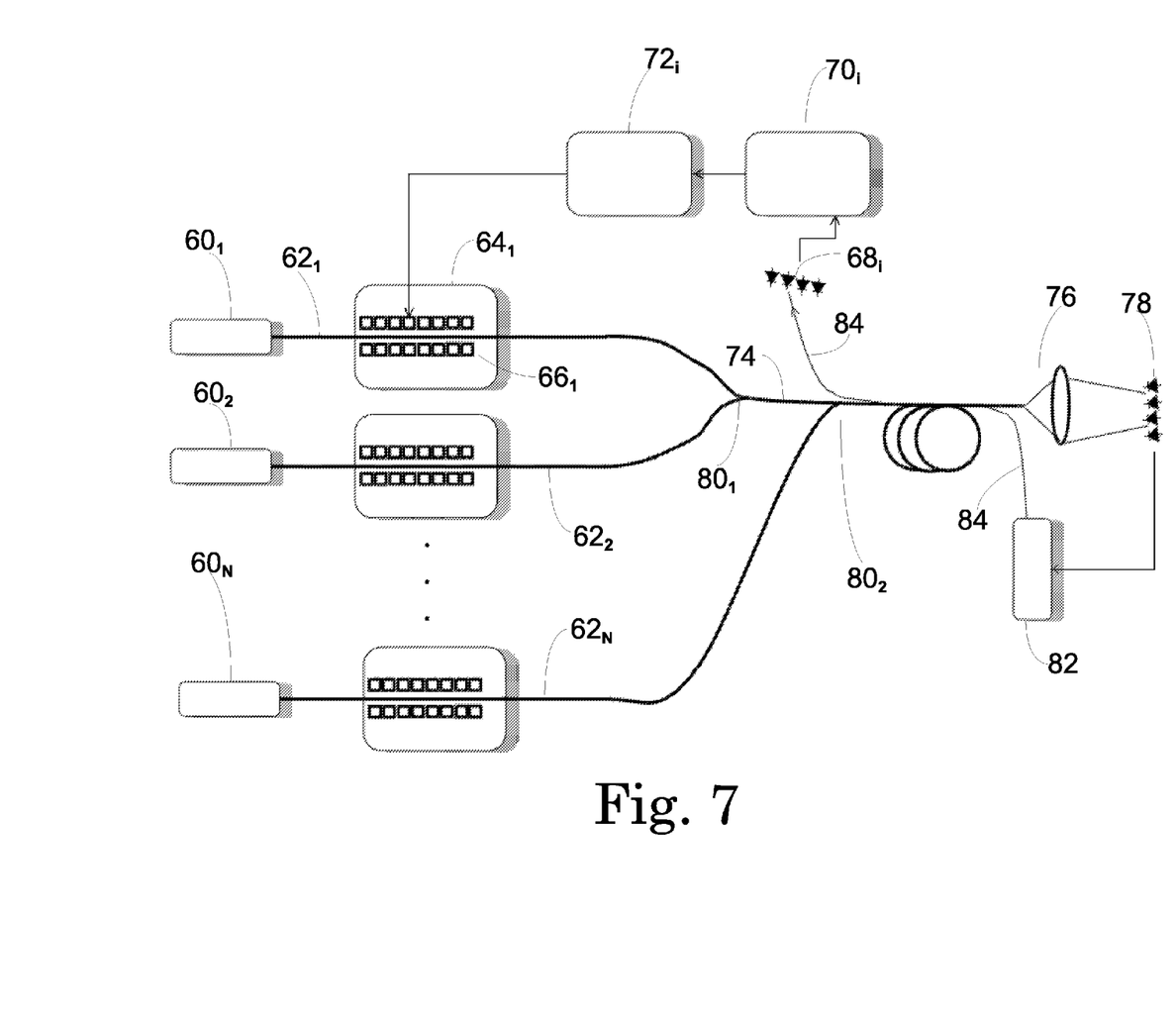
FIG. 7 schematically shows another embodiment of the invention in which the receiver photodiodes are used to create a feedback for the actuators.

FIG. 7 schematically shows another embodiment of the invention in which output from the receiver photodiodes 78 is sent to an output signal processor unit 82 used to create a feedback signal for the actuators 66. The feedback signal is transmitted back to the photodiodes 68 on the input side by an additional backward optical channel 84 via MMF 74. In this case GI-MMF and also non-mode preserving MMF can be used for the long length of fiber used to transmit the signals to a distant receiver, since the feedback photodiodes array senses the resulting spatial modes composition after a significant mixing in the long fiber has occurred. This embodiment is similar to that shown in FIG. 11 in that each channel comprises its own AC components and one set of FSP components is used with multiplexing as described herein above.

Figure 8:
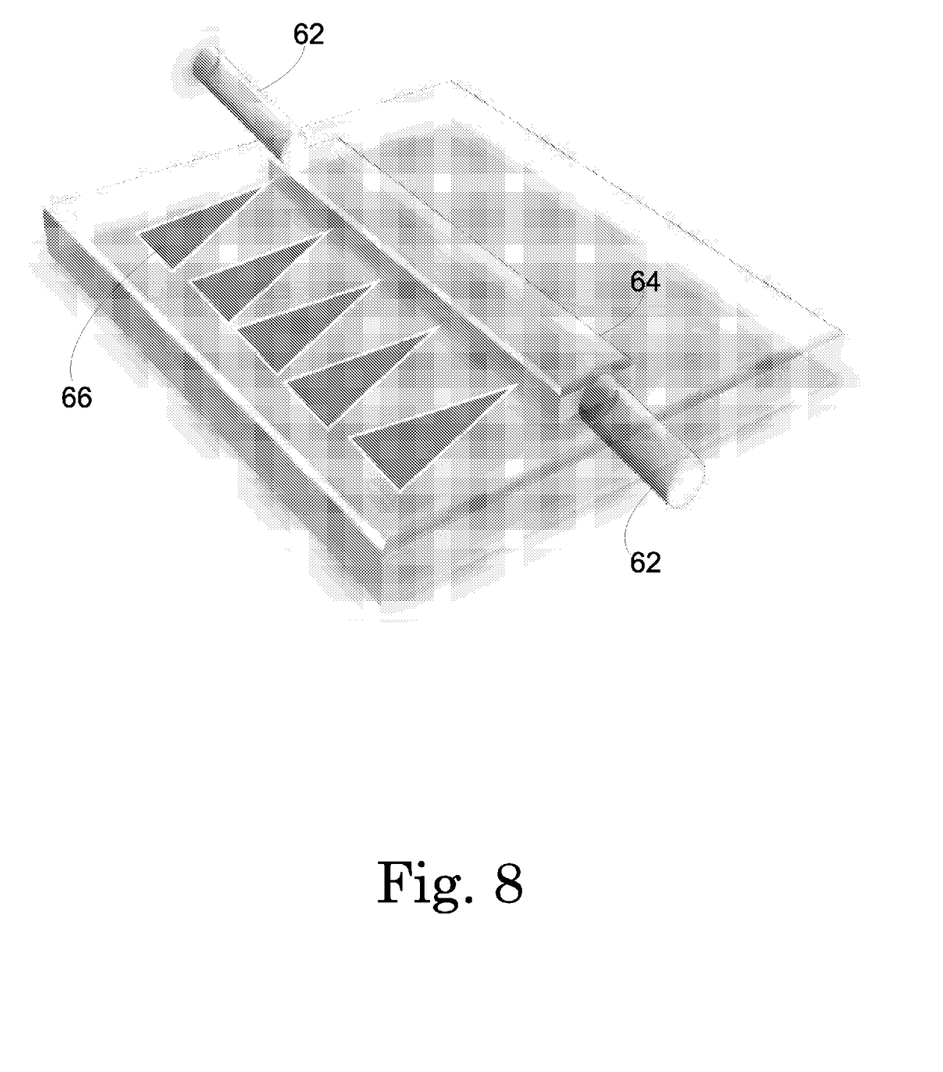
FIG. 8 schematically shows a detailed view of the waveguide with actuators.

FIG. 8 schematically shows a detailed view of the waveguide with actuators 38. Waveguides and actuators suitable for use in this invention are described in co-pending Patent Application IL 220027 by the same applicant and also in U.S. Pat. No. 7,945,130 in which they are used to implement mode homogenizing for laser transmission in optical fibers.

In the embodiment shown in FIG. 8 actuation is implemented as a series of anisotropic phase disturbances applied by electric field potential to electrodes 66. Input MMF 62 and output MMF 62' are shown coupled to waveguide 64. The waveguide is implemented in a material having a significant electro-optic effect, capable of creating a spatially non-uniform phase disturbance gradually controllable by the electric potential applied to the electrodes 66.

Figure 9:
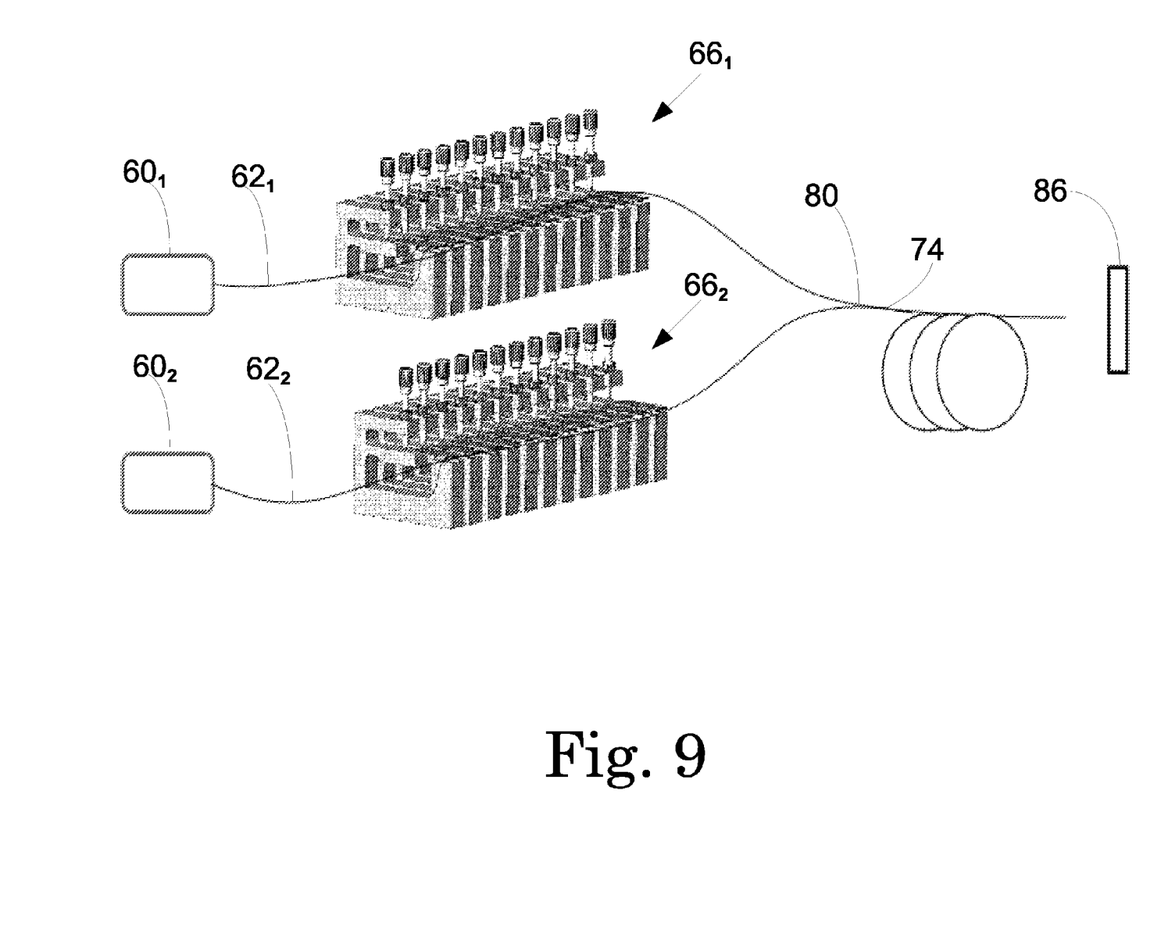
FIG. 9 schematically shows an experimental setup used to demonstrate the invention.

FIG. 9 schematically shows an experimental setup used to demonstrate the invention. This figure illustrates an embodiment of the invention wherein the mode mixing is carried out without the use of waveguides as in FIGS. 5, 7 and 11. In the embodiment of FIG. 9, two modulated light sources $60_1$ and $60_2$ are used to input signals to MMF $62_1$ and $62_2$ respectively. Each of the MMFs passes through a set of actuators $66_1$ and $66_2$ and then they are connected to MMF 74 by beam combiner 80. The actuators $66_1$ and $66_2$ are implemented as piezoelectric benders used to create a controlled mode mixing by bending the fiber. Each set has 12 actuators. Actuators of this type are described in more detail in the above referenced IL 220027 and U.S. Pat. No. 7,945,130. The output from fiber 74 is coupled to an imaging array device 86.

Figure 10:
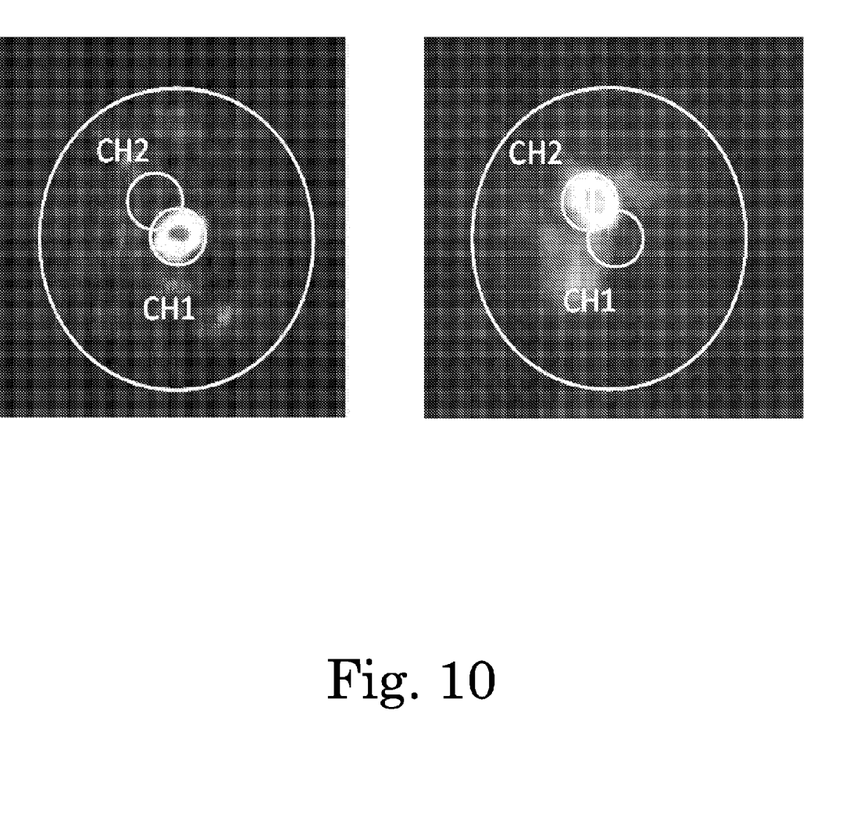
FIG. 10 shows the resulting spatial beam profiles of two channels after applying control signals to the actuators in the setup shown in FIG. 9.

FIG. 10 is shows the resulting spatial beam profiles of two channels after applying control signals to actuators $66_1$ and $66_2$. A clear spatial separation between the channels was observed as shown in FIG. 10.

Although embodiments of the invention have been described by way of illustration, it will be understood that the invention may be carried out with many variations, modifications, and adaptations, without exceeding the scope of the claims.

The invention claimed is:

1. A method for creating mode division multiplexed channels in a multimode optical fiber (MMF), wherein said channels are capable of integration into photonic integrated circuits and possess direct spatial separation at the receiver end of said circuit, said method comprising:
   A. creating at least two channels, wherein for each of said channels:
      a) transmitting light from a modulated light source through an input end of a MMF that passes through a set of actuators;
      b) activating said set of actuators to induce controllable mode mixing in a waveguide;
      c) detecting light that exits said waveguide with a feedback photodiode array;
      d) feeding output of said feedback photodiode array to a signal processor unit;
      e) feeding signals processed by said signal processor unit to an actuator controller;
      f) using output signals from said actuator controller as feedback to control said actuators;
   B. coupling light at an output end of the MMF in each of said at least two channels into a single long length MMF;
   C. detecting the light from an output end of said single long length MMF with a receiver array of photodiodes; and wherein:
      each channel comprises a set of actuator control (AC) components and a set of feedback signal processing (FSP) components; the long length MMF is a Gradient Index MMW (GI-MMF); and, in step (c), for each channel, the feedback photodiode array detects light from a location between said AC components and a beam connector that couples said channel to said GI-MMF.

2. A method for creating mode division multiplexed channels in a multimode optical fiber (MMF), wherein said channels are capable of integration into photonic integrated circuits and possess direct spatial separation at the receiver end of said circuit, said method comprising:
   A. creating at least two channels, wherein for each of said channels:
      a) transmitting light from a modulated light source through an input end of a MMF that passes through a set of actuators;
      b) activating said set of actuators to induce controllable mode mixing in a waveguide;
      c) detecting light that exits said waveguide with a feedback photodiode array;
      d) feeding output of said feedback photodiode array to a signal processor unit;
      e) feeding signals processed by said signal processor unit to an actuator controller;
      f) using output signals from said actuator controller as feedback to control said actuators;
   B. coupling light at an output end of the MMF in each of said at least two channels into a single long length MMF;
   C. detecting the light from an output end of said single long length MMF with a receiver array of photodiodes; and wherein:
      each channel comprises its own set of AC components; feedback to the actuators is provided by means of a single set of FSP components; feedback is provided to each channel sequentially by connecting said channel to said set of FSP components while all other channels are switched off; the long length MMF is a GI-MMF; and, in step (c), for each channel, the feedback photodiode array detects light from a location on said GI-MMF after all beam connectors that couple said channels to said GI-MMF.

3. A method for creating mode division multiplexed channels in a multimode optical fiber (MMF), wherein said channels are capable of integration into photonic integrated circuits and possess direct spatial separation at the receiver end of said circuit, said method comprising:
   A. creating at least two channels, wherein for each of said channels:
      a) transmitting light from a modulated light source through an input end of a MMF that passes through a set of actuators;
      b) activating said set of actuators to induce controllable mode mixing in a waveguide;
      c) detecting light that exits said waveguide with a feedback photodiode array;
      d) feeding output of said feedback photodiode array to a signal processor unit;
      e) feeding signals processed by said signal processor unit to an actuator controller;
      f) using output signals from said actuator controller as feedback to control said actuators;
   B. coupling light at an output end of the MMF in each of said at least two channels into a single long length MMF;
   C. detecting the light from an output end of said single long length MMF with a receiver array of photodiodes; and wherein:
      each channel comprises its own set of AC components; feedback to the actuators is provided by means of a single set of FSP components; feedback is provided to each channel sequentially by connecting said channel to said set of FSP components while all other channels are switched off; the long length MMF is comprised of one of a GI-MMF, a non-mode preserving MMF, and lengths of GI-MMF and non-mode preserving MMF optically coupled together; and, in step (c), for each channel, the feedback photodiode array detects feedback signals created by an output signal processor from output from the receiver photodiodes and transmitted from the output side to the input side of said long length MMF by a backward optical channel via said long length MMF.

4. An optical communication system comprising mode division multiplexed channels in a long length multimode optical fiber (MMF), said system comprising:

A. on the input side:
   a) at least two input channels comprised of a modulated light source and a length of MMF that passes through a set of actuators;
   b) at least one set of feedback signal processing (FSP) components, wherein said set of FSP components is comprised of a photodiode array, a processor unit, and an actuators controller;
B. a single long length of MMF;
C. at least two beam connectors, one for each of said channels adapted to optically couple said input channels to said single long length of MMF; and
D. a detector array of photodiodes on the output side of said single long length of MMF; and wherein:
   the long length MMF is comprised of one of a Gradient Index MMW (GI-MMF), a non-mode preserving MMF, and lengths of GI-MMF and non-mode preserving MMF optically coupled together.

5. The system of claim 4, wherein each of the at least two input channels additionally comprises a waveguide.

6. The system of claim 4, wherein each input channel comprises a set of FSP components and a set of actuator control (AC) components, wherein each set of AC components is comprised of a waveguide and a set of actuators; the long length MMF is a GI-MMF; and, for each channel, said set of FSP components is coupled to said system such that the feedback photodiode array detects light from a location between said AC components and the beam connector that couples said channel to said GI-MMF.

7. The system of claim 4, wherein each input channel comprises its own set of AC components; said system comprises one set of FSP components, which is adapted to provide feedback to the actuators in each channel sequentially by connecting said channel to said set of FSP components while all other channels are switched off; the long length MMF is a GI-MMF; and said set of FSP components is coupled to said system such that, for each channel, the feedback photodiode array detects light from a location on said GI-MMF after all of the beam connectors that couple said input channels to said GI-MMF.

8. The system of claim 4, comprising an output signal processor adapted to receive and create output feedback signals from the detector array of photodiodes on the output side of said single long length of MMF, wherein each input channel comprises its own set of AC components; said system comprises one set of FSP components, which is adapted to provide feedback to the actuators in each channel sequentially by connecting said channel to said set of FSP components while all other channels are switched off; said set of FSP components is coupled to said system such that, for each channel, the feedback photodiode array detects said output feedback signals created by said output signal processor; and said long length MMF comprises a backward optical channel via which said output feedback signals are transmitted from the output side of the long length MMF to the input side of said long length MMF.

\* \* \* \* \*